(12) United States Patent
Brej et al.

(10) Patent No.: US 8,382,147 B2
(45) Date of Patent: Feb. 26, 2013

(54) RAISED RAILS HITCH

(76) Inventors: Thaddeus T Brej, Rocky River, OH (US); Roy Edward Spaw, Grafton, OH (US)

( * ) Notice: Subject to any disclaimer, the term of this patent is extended or adjusted under 35 U.S.C. 154(b) by 64 days.

(21) Appl. No.: 13/116,608

(22) Filed: May 26, 2011

(65) Prior Publication Data

US 2012/0200068 A1 Aug. 9, 2012

Related U.S. Application Data

(60) Provisional application No. 61/439,110, filed on Feb. 3, 2011.

(51) Int. Cl.
*B60D 1/06* (2006.01)

(52) U.S. Cl. .............. 280/511; 280/504; 280/491.2; 280/491.5; 280/510

(58) Field of Classification Search ............. 280/511, 280/504, 491.2, 491.5, 481.2, 505, 507, 514, 280/510
See application file for complete search history.

(56) References Cited

U.S. PATENT DOCUMENTS

| | | | | |
|---|---|---|---|---|
| 2,872,213 | A * | 2/1959 | Hosford | 280/416.1 |
| 4,200,306 | A * | 4/1980 | Helms | 280/494 |
| 4,657,275 | A * | 4/1987 | Carroll | 280/477 |
| 5,322,316 | A * | 6/1994 | Wheeler | 280/507 |
| 5,465,992 | A * | 11/1995 | Anderson | 280/477 |
| 6,217,054 | B1 * | 4/2001 | Klimek et al. | 280/511 |
| 6,554,311 | B1 * | 4/2003 | Blankenship et al. | 280/507 |
| 6,942,237 | B1 * | 9/2005 | Depault | 280/491.5 |
| 7,195,269 | B2 * | 3/2007 | Tambornino | 280/491.1 |
| 7,661,694 | B2 * | 2/2010 | Krespach et al. | 280/511 |
| 2005/0040623 | A1 * | 2/2005 | Krespach et al. | 280/511 |
| 2005/0104327 | A1 * | 5/2005 | Irgens et al. | 280/511 |
| 2008/0100033 | A1 * | 5/2008 | Lynn et al. | 280/504 |

* cited by examiner

*Primary Examiner* — Tashiana Adams
*Assistant Examiner* — Marlon Arce
(74) *Attorney, Agent, or Firm* — Cooper Legal Group, LLC

(57) ABSTRACT

A hitch device for a trailer mount. The hitch device includes a mounting portion for being received within a receiver portion attached to a vehicle. The hitch device includes a tongue portion secured to the mounting portion. The tongue portion includes an upper face, a lower face and a through-hole for receiving a lower portion of a hitch ball. At least one of the upper and lower faces includes a pair of raised rails.

5 Claims, 4 Drawing Sheets

RAISED RAILS HITCH

CROSS-REFERENCE TO RELATED APPLICATIONS

This application claims the benefit of U.S. Provisional Application No. 61/439,110, entitled "Raised Rails Hitch," filed Feb. 3, 2011, the entire disclosure of which is hereby incorporated herein by reference.

FIELD OF THE INVENTION

The present invention relates to a receiver-style hitch system and specifically relates to a tongue portion of a mount that is received within a receiver that is affixed on a vehicle, with the tongue portion having improved strength and improved ability to secure a hitch ball onto the tongue portion.

BACKGROUND OF THE INVENTION

A trailer hitch assembly can be used to attach a towed object, such as a trailer, to a towing object, such as vehicle in the form of a truck, an automobile, a recreational vehicle, or the like. The trailer hitch assembly can include a receiving portion and a mounting portion. The receiving portion can be attached to one object, such as the towing object, and the mounting portion can be attached to the other object, such as the towed object. The mounting portion can be removably attached to the receiving portion, allowing the towing object to tow the towed object. One example of such a removable attachment is via a portion of the mounting portion being inserted into the receiving portion and being secured therein via a pin or the like.

Receiver style hitches are known. In general, a receiver that is affixed on a vehicle has an aperture for receiving a member that is secured therein via a pin or the like. A tongue portion extends from the receiver and has a through hole for receiving a hitch ball which is secured thereon via a threaded nut. Logically, it would be beneficial for the tongue portion to have sufficient strength to resist deformation of the tongue portion. However, such strength should be balanced with weight and material use. Also, it would be beneficial to be able to secure the hitch ball onto the tongue via the use of only a single tool (e.g., a wrench).

BRIEF SUMMARY OF THE INVENTION

The following presents a simplified brief description of the invention in order to provide a basic understanding of some example aspects of the invention. This brief description is not an extensive overview of the invention. Moreover, this brief description is not intended to identify critical elements of the invention nor delineate the scope of the invention. The sole purpose of the brief description is to present some concepts of the invention in simplified form as a prelude to the more detailed description that is presented later.

In accordance with one aspect the present invention provides a hitch device for a trailer mount. The hitch device includes a mounting portion for being received within a receiver portion attached to a vehicle. The hitch device includes a tongue portion secured to the mounting portion. The tongue portion includes an upper face, a lower face and a through-hole for receiving a lower portion of a hitch ball. At least one of the upper and lower faces includes a pair of raised rails.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENT

Figure 1:
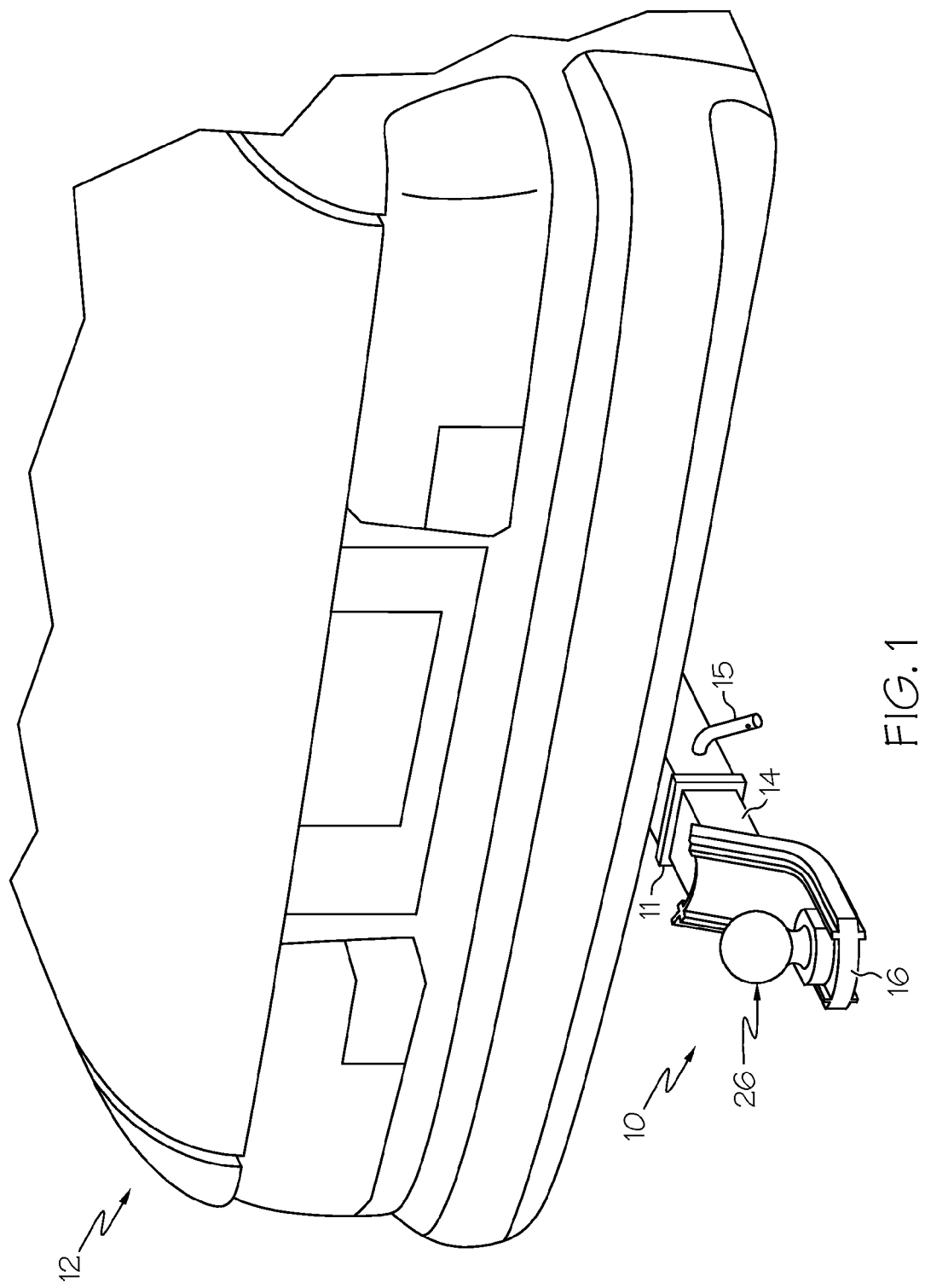
FIG. 1 is a perspective view showing an example raised rails hitch device in accordance with the present invention mounted to a rear portion of an automobile.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

An example raised rails hitch device 10 is illustrated according to at least one aspect of the present invention within FIG. 1. It is to be appreciated that the presented example is just one example and that other, different examples are contemplated. The raised rails hitch device 10 can be considered to be a ball mount, as will be appreciated upon further appreciation of the present disclosure. The raised rails hitch device 10 can be inserted into a receiver 11 located on a vehicle 12. The raised rails hitch device 10 is shown to be mounted to an automobile, but the raised rails hitch can be mounted to a variety of structures, including trucks, recreation vehicles, stationary devices, etc. The receiver 11 can be attached to a rear center, underneath portion of the vehicle 12 in a variety of ways, and could be removably attached to the vehicle 12. It is to be understood that FIG. 1 merely shows an example and other attachment locations/arrangements are contemplated.

It is to be appreciated that a mounting portion 14 of the raised rails hitch device 10 is to be inserted into a receiver 11 located on a vehicle 12 as indicated in FIG. 1. As such, the mounting portion 14 can be considered to be an insert. The mounting portion 14, which is received within the receiver 11, may have any shape such as a rectangular bar stock shape or other partially hollowed out shapes or solid shapes. The mounting portion 14, and thus the entire raised rails hitch device 10, can be secured to the receiver 11 via a locking pin 15 or similar device via extension though holes in the receiver 11 and the mounting portion (not visible in FIG. 1).

Figure 2:
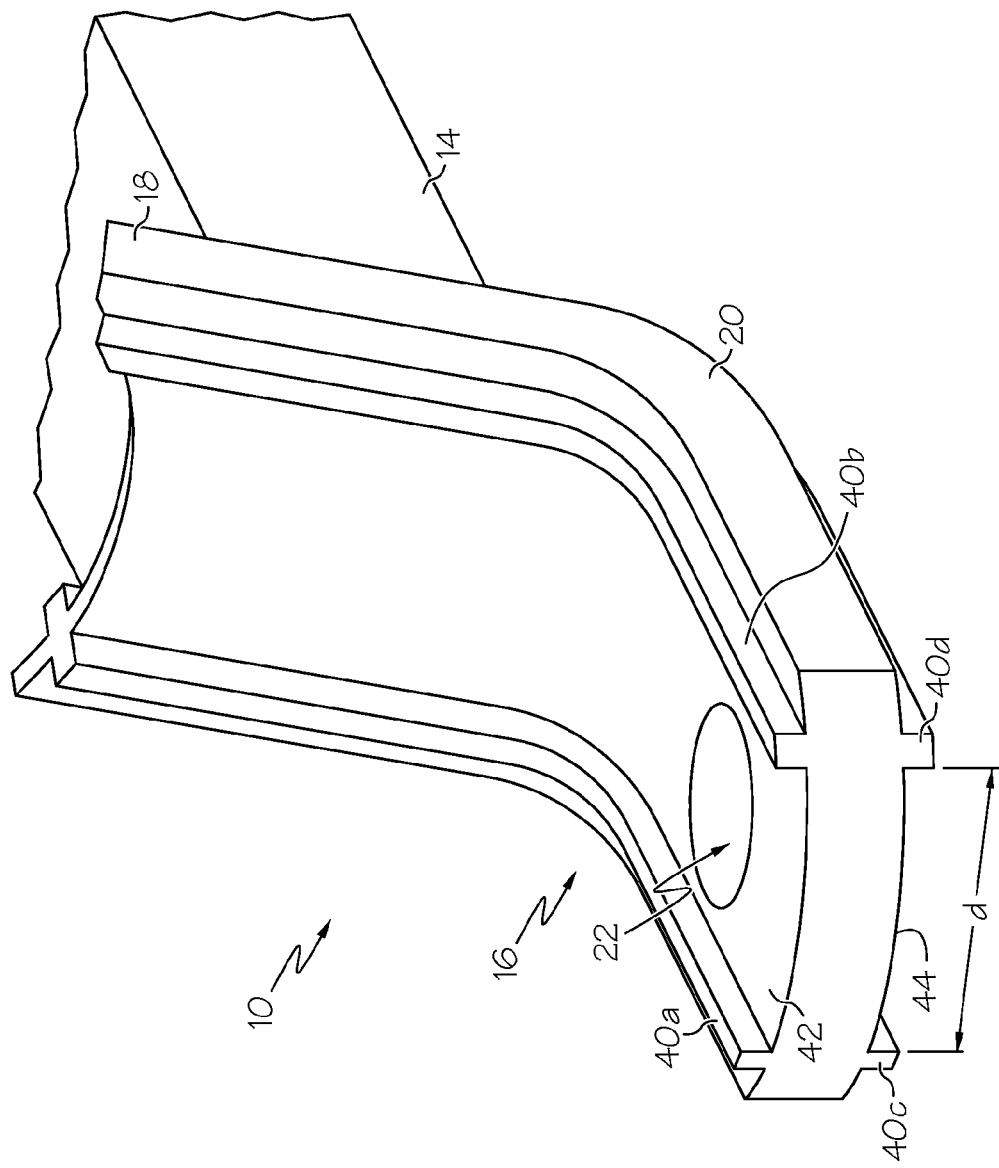
FIG. 2 is an enlarged, partial, perspective view of the example raised rails hitch device of FIG. 1 which is focused upon a tongue portion of the raised rails hitch device, with a hitch ball removed.

A tongue portion 16 is secured onto the mounting portion 14. The tongue portion 16 can be secured onto the mounting portion 14 by welding or any other securement methods as are known in the art. Within the shown example, the tongue portion 16 (FIG. 2) extends with an angled segment 18 secured to the mounting portion 14 received within the receiver 11 and extends downward to a generally horizontal segment 20. It is to be appreciated that the length of the tongue portion 16 may be any suitable length. For example, the angled segment 18 may have any desirable length. Also, the horizontal segment 20 may have any desirable length. Also, it is to be appreciated that the tongue portion 16 may extend upwardly rather then downwardly from the mounting portion 14 received within the receiver 11. A through hole 22 is located on the horizontal segment 20.

Figure 3:
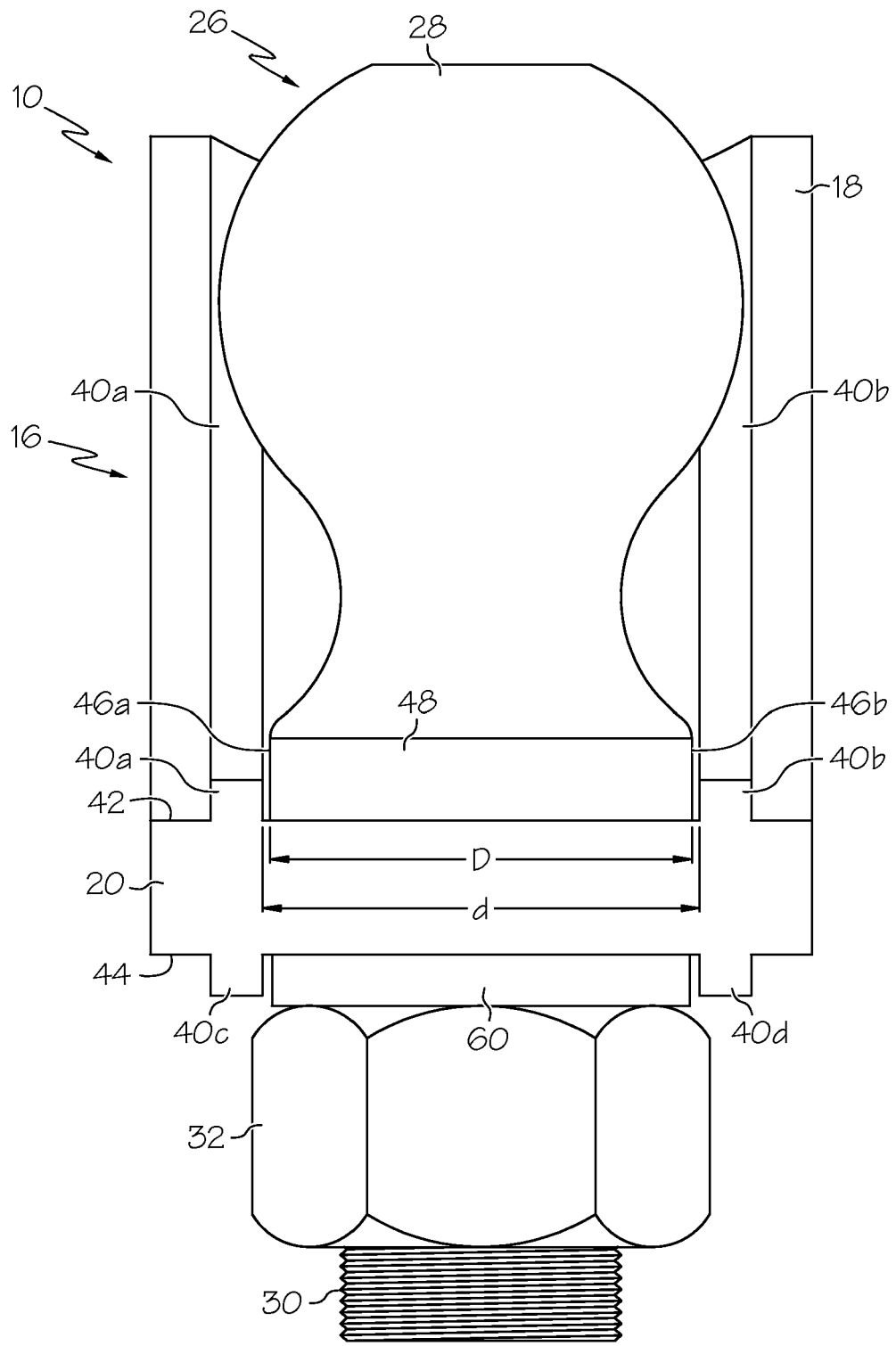
FIG. 3 is an enlarged face-on view of the example raised rails hitch device shown in FIG. 1, with the hitch ball and associated securing threaded nut positioned thereon.

Turning to FIG. 3, a hitch ball 26 is located to extend through the through hole 22 for securing to the tongue portion 16. The hitch ball 26 is to be received into a trailer coupling or the like. In general, the hitch ball 26 has a spherical upper end 28 and a threaded lower portion 30. A securing threaded nut 32 is threaded onto the threaded lower portion 30 to secure the hitch ball 26 onto the tongue portion 16.

Figure 4:
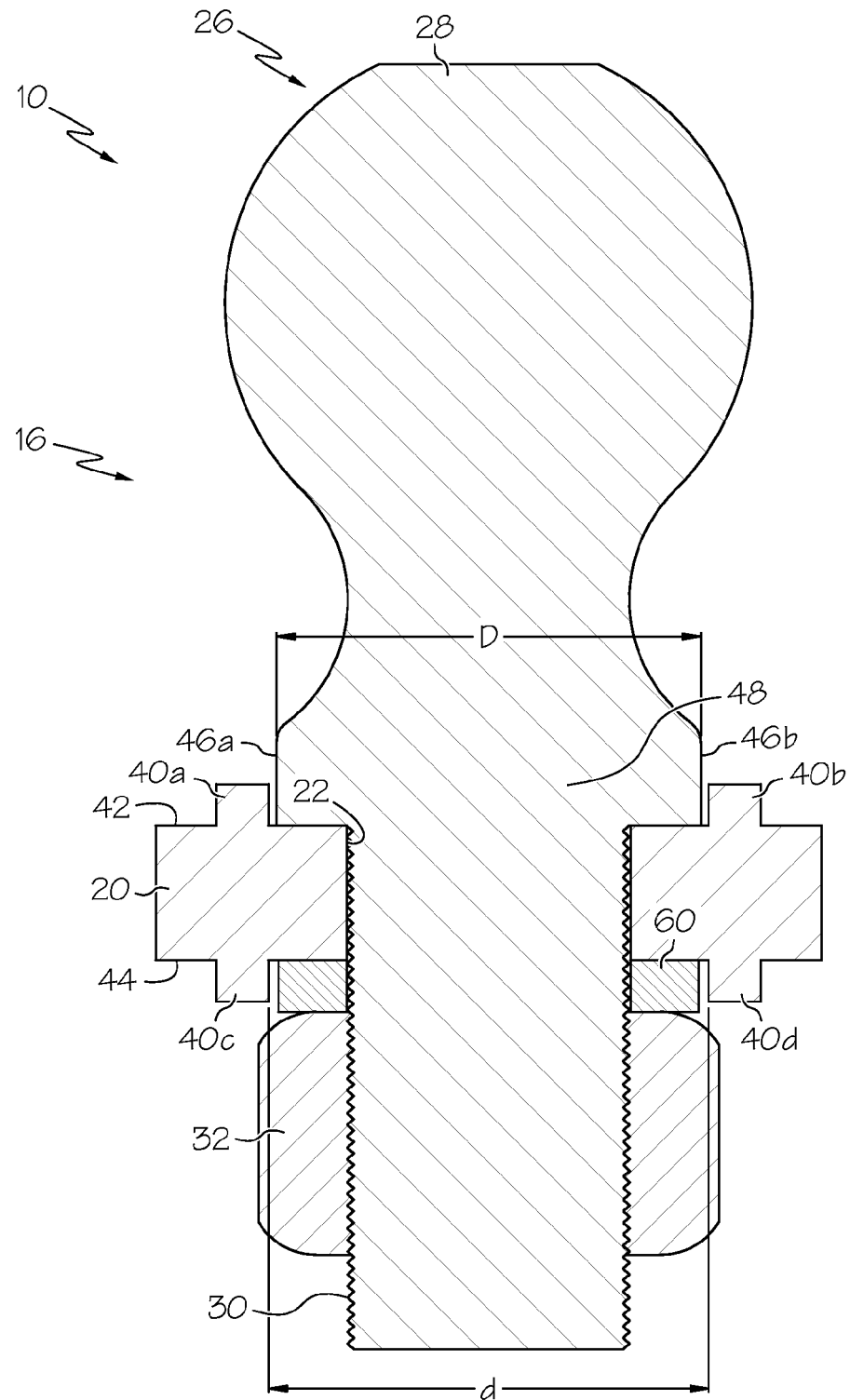
FIG. 4 is a sectional view taken generally along the axis of a hole through the tongue portion and with the background of the raised rails hitch device omitted to show the sectional profile of the raised rails hitch device.

Turning to FIG. 4, the tongue portion 16 of the raised rails hitch device 10 has raised rails 40a-40d extending there along. A pair of raised rails 40a, 40b extends along an upper face 42 and a pair of raised rails 40c, 40d extends along a lower face 44. It is to be appreciated that although two pairs of rails (40a, 40b and 40c, 40d) are shown in the example, one a single pair or rails may be provided (e.g., only the top pair of raised rails 40a, 40b). The raised rails 40a-40d can provide a certain amount of strength, integrity, rigidness, or the like. Such increases are provided without undo increase in bulk and material used within the tongue portion 16.

In the shown example, the raised rails 40a-40d, and in particular the top pair of raised rails 40a, 40b, are spaced a distance d to provide a specific type of cooperation with the hitch ball 26 mounted onto the tongue portion 16. Specifically, it is to be appreciated that the hitch ball 26 has at least two flats 46a and 46b located at a collar portion 48 resting upon the upper face 42 of the tongue portion 16. The spacing between the flats 46a, 46b has a general distance D. The spacing between the pair of raised rails 40a, 40b on the upper face 42 on the tongue portion 16 has the general distance d. The distance D is slightly smaller than the distance d. Thus, the flats 46a, 46b on the hitch ball 26 fit between the raised rails 40a, 40b at least in a snug fit to prevent rotation of the hitch ball 26 relative to the tongue portion 16. In other words, the raised rails 40a, 40b can prevent rotation of the hitch ball 26 relative to the tongue portion 16. Thus, when the securing threaded nut 32 is threaded onto the threaded lower portion 30, the hitch ball 26 is constrained against rotational movement during rotation of the securing threaded nut 32. Thus, only a single wrench, engaging upon the securing threaded nut 32, is necessary to secure the hitch ball 26 onto the tongue portion 16. It should be noted that a spacer 60 can be utilized against the lower face 44 of the tongue portion 16 to maintain a spacing between the securing threaded nut 32 and the raised rails 40c, 40d on the lower face 44 so that there is not interference by the raised rails 40c, 40d against rotation of the securing threaded nut 32 onto the threaded lower portion 30 of the hitch ball 26. It should be appreciated that the spacer 60 may be a washer or a locking type washer. Also, it is to be appreciated that such a washer may be omitted so long as the securing threaded nut 32 has proper sizing to avoid binding interference with the raised rails 40c, 40d on the lower face 44 of the tongue portion 16.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A hitch device for a trailer mount, the hitch device including:
   a mounting portion for being received within a receiver portion attached to a vehicle; and
   a tongue portion secured to the mounting portion, the tongue portion including an upper face, a lower face and a through-hole for receiving a lower portion of a hitch ball, and at least one of the upper and lower faces including a pair of raised rails;
   wherein the raised rails interact with a set of flats on the hitch ball to prevent rotation relative to the tongue portion.

2. The hitch device of claim 1, wherein the tongue portion includes one pair of raised rails located on the upper face and another pair of raised rails located on the lower face.

3. The hitch device of claim 1, wherein the hitch ball includes flats spaced approximately a distance D, and wherein the raised rails are spaced approximately a distance d.

4. The hitch device of claim 1, wherein the raised rails interact with the hitch ball to prevent rotation of the hitch ball relative to the tongue portion.

5. The hitch device of claim 1, wherein the raised rails are configured to provide strength to the tongue portion.

\* \* \* \* \*